No. 869,160. PATENTED OCT. 22, 1907.
M. E. BROWN.
EGG WRAPPER.
APPLICATION FILED MAR. 3, 1906.

Witnesses
Frank B. Hoffman
John F. Byrne

Inventor
Mary Etta Brown
By Victor J. Evans
Attorney

UNITED STATES PATENT OFFICE.

MARY ETTA BROWN, OF CAVALIER, NORTH DAKOTA.

EGG-WRAPPER.

No. 869,160.     Specification of Letters Patent.     Patented Oct. 22, 1907.

Application filed March 3, 1906. Serial No. 304,019.

*To all whom it may concern:*

Be it known that I, MARY ETTA BROWN, a citizen of the United States, residing at Cavalier, in the county of Pembina and State of North Dakota, have invented new and useful Improvements in Egg-Wrappers, of which the following is a specification.

This invention relates to egg wrappers, the object of the invention being to provide what may be termed a "safety egg wrapper" for shipping or transporting eggs for hatching and other purposes, the wrapper embodying a flexible sheet which will entirely inclose the egg, and protecting leaves or sections which will form an effective guard for the egg and prevent breaking the same in ordinary handling.

With the above general object in view, the invention consists in the novel construction, combination and arrangement of parts, hereinafter more fully described, illustrated and claimed.

Figure 3:
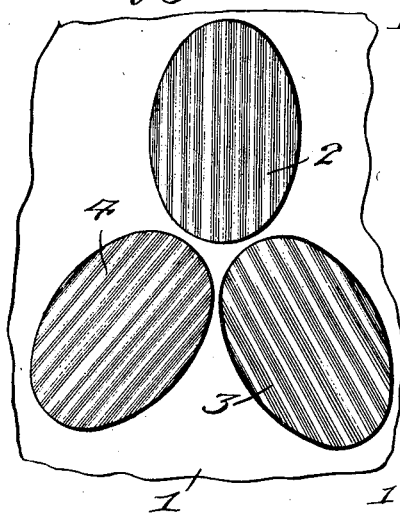
Figure 1:
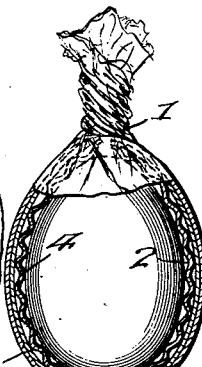
Figure 4:
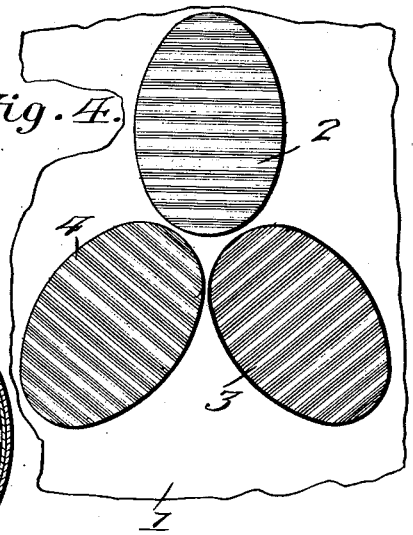
Figure 2:
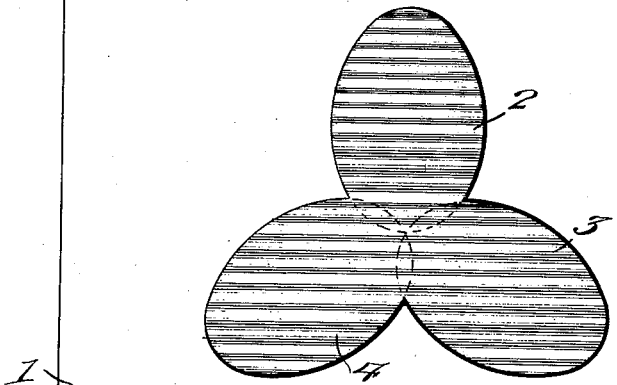

In the accompanying drawings, Figure 1 is a sectional view of an egg wrapper, embodying the present invention. Fig. 2 is a plan view of the same spread out. Figs. 3 and 4 are plan views similar to Fig. 2, showing slight modifications.

Referring to the drawings, the egg wrapper is seen to comprise a sheet 1 of paper which may be of any desired thickness and strength but which is preferably made quite thin so that when the egg is wrapped therein, the marginal edge of said sheet of paper may be twisted upon itself, as illustrated in Fig. 1, to prevent the wrapper becoming loose and exposing and releasing the egg contained therein.

Connected with the central portion of the sheet 1 is a protector embodying a series of leaves or sections 2, 3 and 4, each of which is substantially egg-shaped, and these leaves or sections are, under the preferred embodiment of the invention, joined together or all made in one piece, as shown in Fig. 2, although said leaves or sections may be made in separate pieces and applied to the sheet 1 so that the inner ends thereof will be clustered together, as illustrated in Figs. 3 and 4.

The leaves or sections 2, 3 and 4, may be composed of thick paper, cork or felt, or any suitable material to cushion any blow which may be imparted to the egg in ordinary handling. A good material consists of the ordinary two-ply corrugated cardboard such as is commonly used in wrapping bottles and the like, and the corrugations may all extend in the same direction, as shown in Fig. 2, or they may extend lengthwise of the sections, as shown in Fig. 3 or transversely of the sections, as shown in Fig. 4. Ordinarily, the sections 2, 3 and 4, will be secured to the central portion of the sheet 1 by pasting the same thereon, although other securing means may be resorted to without departing from the principle or sacrificing any of the advantages of the invention.

I claim:

The herein described egg wrapper comprising a rectangular piece of thin flexible paper having secured thereto three oval shaped corrugated paper cushions, said cushions being disposed radially from a central point on said paper sheet and spaced apart to form lines of fold from the center of the sheet so that said sheet may be doubled or folded about an egg and the corners twisted to hold the cushions in contact with the egg to cover all sides thereof.

In testimony whereof, I affix my signature in presence of two witnesses.

MARY ETTA BROWN.

Witnesses:
    L. W. MUSSELMAN,
    ED. H. STONG.